(12) United States Patent
Drori et al.

(10) Patent No.: US 8,317,439 B2
(45) Date of Patent: Nov. 27, 2012

(54) CUTTING TOOL

(75) Inventors: Gideon Drori, Mitzpe Hila (IL); Yaaqov Kisos, Nahariya (IL); Eitan Gonen, Kfar Vradim (IL); Daniel Men, Haifa (IL)

(73) Assignee: Iscar, Ltd., Tefen (IL)

( * ) Notice: Subject to any disclaimer, the term of this patent is extended or adjusted under 35 U.S.C. 154(b) by 1070 days.

(21) Appl. No.: 12/256,750

(22) Filed: Oct. 23, 2008

(65) Prior Publication Data
US 2009/0110501 A1 Apr. 30, 2009

(30) Foreign Application Priority Data
Oct. 30, 2007 (IL) ........................................... 187034

(51) Int. Cl.
*B23B 51/00* (2006.01)
(52) U.S. Cl. ........... 408/83; 408/144; 408/224; 408/705
(58) Field of Classification Search .................... 408/83, 408/144, 224, 705, 57, 58, 59, 79, 80, 81, 408/82, 199, 223, 227, 229
See application file for complete search history.

(56) References Cited

U.S. PATENT DOCUMENTS

| | | | | |
|---|---|---|---|---|
| 3,274,863 A | * | 9/1966 | Faber | 408/207 |
| 4,293,252 A | * | 10/1981 | Kress et al. | 408/224 |
| 4,616,964 A | * | 10/1986 | Nomura | 408/144 |
| 5,238,335 A | * | 8/1993 | Nomura | 408/59 |
| 5,302,060 A | * | 4/1994 | Nystrom et al. | 408/224 |
| 5,328,304 A | * | 7/1994 | Kress et al. | 408/83 |
| 5,964,553 A | * | 10/1999 | Blomberg et al. | 408/224 |
| 6,019,553 A | * | 2/2000 | Yakamavich, Jr. | 408/224 |
| 6,059,492 A | * | 5/2000 | Hecht | 408/144 |
| 6,682,275 B1 | * | 1/2004 | Lindblom et al. | 408/59 |
| 7,134,816 B2 | * | 11/2006 | Brink | 408/226 |
| 7,320,565 B2 | * | 1/2008 | Danielsson et al. | 408/144 |
| 7,326,009 B2 | * | 2/2008 | Lindblom | 408/59 |
| 7,448,832 B2 | * | 11/2008 | Annanolli et al. | 408/81 |
| 7,572,088 B2 | * | 8/2009 | Biscay | 408/59 |

(Continued)

FOREIGN PATENT DOCUMENTS

DE 25 22 565 12/1976

(Continued)

OTHER PUBLICATIONS

International Search Report in PCT/IL2008/001411, dated Feb. 26, 2009.

*Primary Examiner* — Eric A Gates
*Assistant Examiner* — Justin Sikorski
(74) *Attorney, Agent, or Firm* — Womble Carlyle

(57) ABSTRACT

A cutting tool of the sort used for deep hole drilling has a cutting head mounted on a shank. The cutting head is formed asymmetrically with respect to a longitudinal axis and has at least one cutting edge. The cutting head has guiding segments that extend from a forward end to a rear end of the cutting head. Each of the guiding segments has a guiding pad in the periphery thereof. A forward end of the guiding pad lies on a cylindrical envelope defined by the cutting diameter of the cutting tool. A rear engagement portion of the cutting head is engaged with a forward engagement portion of the shank. The cutting head is made from sintered carbide powders and the guiding pads are integrally formed with the cutting head.

21 Claims, 13 Drawing Sheets

| U.S. PATENT DOCUMENTS | | | |
|---|---|---|---|
| 7,645,102 B2 * | 1/2010 | Nomura et al. | 408/199 |
| 8,021,088 B2 * | 9/2011 | Hecht | 408/231 |
| 2002/0085891 A1 | 7/2002 | Moore | |
| 2005/0025594 A1 | 2/2005 | Lindblom | |
| 2005/0249562 A1 | 11/2005 | Frejd | |

| FOREIGN PATENT DOCUMENTS | | | |
|---|---|---|---|
| DE | 38 26 239 | | 2/1990 |
| JP | 59073215 A | * | 4/1984 |

* cited by examiner

CUTTING TOOL

FIELD OF THE INVENTION

The present invention relates to cutting tools for deep hole drilling.

BACKGROUND OF THE INVENTION

Such cutting tools usually comprise an elongated steel body having a through bore that extends from the body rear end and opens into the body forward end. A hard metal cutting tip is typically brazed in the forward end of the steel body. In order to guide and stabilize the cutting tool through the cutting operation, guiding pads are attached to the periphery of the steel body. Such an arrangement encounters a disadvantage of the necessity to braze the cutting tips to the steel body. Moreover, the need to accurately locate and attach the guiding pads to the steel body involves an expensive and time consuming process.

US Patent Application Publication No. US 2005/0025594 A1 discloses an edge-carrying drill body having a front head and a rearwardly extending hollow shaft adapted for connection with a tube, the front head being configured symmetrically about the center axis of rotation and including a bridge defining a plurality of chip inlet openings in the front head. Due to the symmetrical construction of the front head it has no guiding pads, a fact that is disadvantageous if it is necessary to form an asymmetric front head, and, especially when only one cutting edge is required or possible.

SUMMARY OF THE INVENTION

In accordance with the present invention there is provided a cutting head formed asymmetrically with respect to a longitudinal axis A and comprising:

a cutting head forward end, a cutting head rear end distal the cutting head forward end and a peripheral surface therebetween, at least one major guiding segment extending from the cutting head forward end to the cutting head rear end, the at least one major guiding segment comprising at the cutting head forward end a cutting edge that extends from a forward end center zone of the cutting head to the peripheral surface, a radially outermost end of the cutting edge defines a cutting diameter D, the cutting edge has a rake surface extending rearwardly therefrom, a major guiding pad associated with the cutting edge, the major guiding pad having a guiding pad forward end, lying on a cylindrical envelope defined by the cutting diameter D, and a guiding pad rear end axially distal therefrom, the guiding pad forward end joins the cutting edge at the radially outermost end of the cutting edge, wherein the cutting head is made from sintered carbide powders and the guiding pads are integrally formed with the cutting head to have unitary one-piece construction.

Typically, the guiding pads taper rearwardly at an angle of 0° to 1° with respect to the longitudinal axis A.

Further typically, the cutting head comprises a minor guiding segment which is circumferentially separated from the major guiding segment, the minor guiding segment comprises a minor guiding pad at a circumferential portion thereof.

According to a specific embodiment of the present invention, the cutting head comprises a support guiding segment which is circumferentially separated from the minor guiding segment, the support guiding segment comprises a support guiding pad at a circumferential portion thereof.

If desired, the cutting edge comprises cutting edge segments that are spaced apart from each other.

Further if desired, the cutting edge comprises cutting edge segments that are co-linear and spaced apart from each other.

Still further if desired, the cutting edge comprises cutting edge segments that lay on imaginary cutting edge lines that are spaced apart from each other.

Advantageously, the cutting head comprises a chip breaker extending rearwardly from a rear end of the rake surface, the chip breaker is slanted axially rearwardly and tangentially forwardly with respect to the cutting edge.

Further advantageously, the chip breaker is axially rearwardly and tangentially forwardly curved with respect to the cutting edge.

According to a specific embodiment of the present invention, a lower portion of a major guiding segment is provided with a recess that is axially forwardly and tangentially forwardly curved.

According to another embodiment of the present invention, the peripheral surface of the cutting head is provided with a locating slot that extends from the cutting head forward end to the cutting head rear end.

Typically, the cutting edge extends from the longitudinal axis A of the cutting head to the peripheral surface.

In accordance with the present invention there is provided a drilling cutting tool comprising a cutting head and a shank having a longitudinal axis B, the cutting head being formed asymmetrically with respect to a longitudinal axis A and comprising:

a cutting head forward end, a cutting head rear end distal the cutting head forward end and a peripheral surface therebetween, at least one major guiding segment extending from the cutting head forward end to the cutting head rear end and having a head circular extension, the at least one major guiding segment comprising at the cutting head forward end a cutting edge that extends from a forward end center zone of the cutting head to the peripheral surface, a radially outermost end of the cutting edge defines a cutting diameter D, the cutting edge has a rake surface extending rearwardly therefrom, a major guiding pad associated with the cutting edge, the major guiding pad having a guiding pad forward end, lying on a cylindrical envelope defined by the cutting diameter D, and a guiding pad rear end axially distal therefrom, the guiding pad forward end joins the cutting edge at the radially outermost end of the cutting edge, the shank having a forward engagement portion at a forward end of the shank and a rear engagement portion rearward to the forward engagement portion, a through bore extends between the shank forward end and a shank rear end, the shank being connected to the cutting head through the forward engagement portion, wherein the cutting head is made from sintered carbide powders and the guiding pads are integrally formed with the cutting head to have unitary one-piece construction.

Typically, the shank forward end is brazed to the cutting head rear end.

Advantageously, the shank forward end is provided with at least one forwardly projecting projection having a shank circular extension, the forwardly projecting projection mates with the at least one major guiding segment of the cutting head, and the shank circular extension is complementary to the head circular extension.

Typically, the rear engagement portion of the shank is an external thread.

Further typically, the forward engagement portion has a forward diameter F, the rear engagement portion has a rear diameter K, and the forward diameter F is larger than the rear diameter H.

If desired, the peripheral surface of the cutting head is further provided with a locating slot that extends from the cutting head forward end to the cutting head rear end and the shank is further provided with a forwardly projecting projection that mates with the locating slot when the cutting head is put on the shank such that the longitudinal axis A of the cutting head coincides with the longitudinal axis B of the shank.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
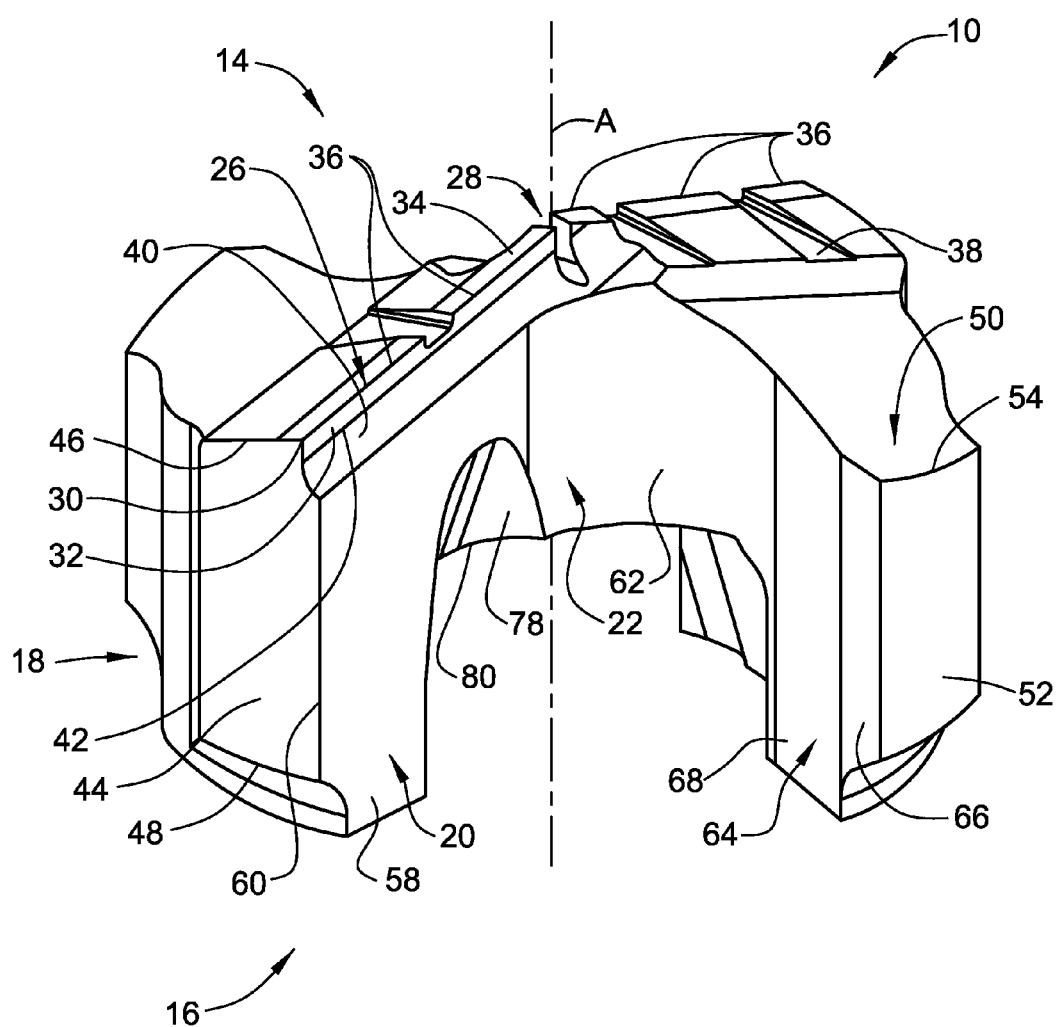
FIG. 1 is a perspective view of a first embodiment of a cutting head in accordance with the present invention.
Figure 2:
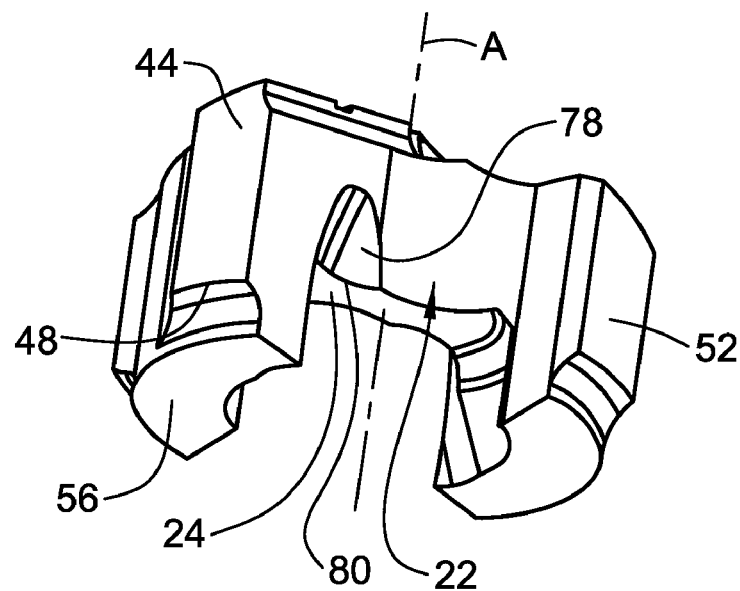
FIG. 2 is a rear perspective view of the cutting head of FIG. 1.
Figure 3:
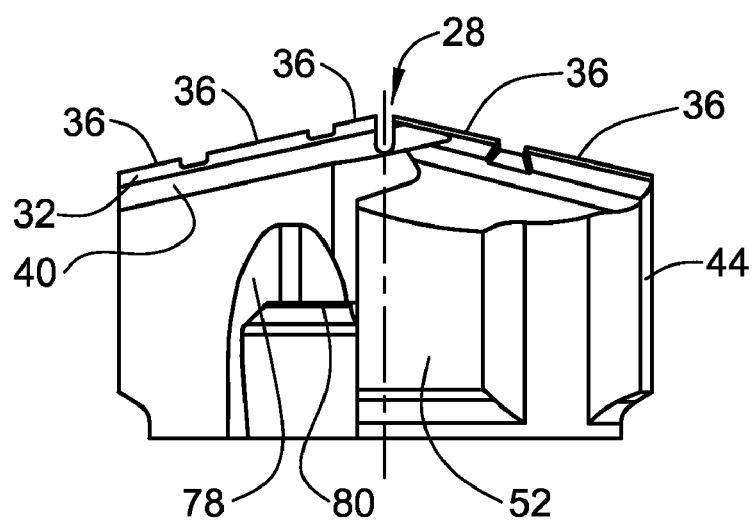
FIG. 3 is a side view of the cutting head of FIG. 1.

Attention is first drawn to FIGS. 1 to 5 that show a cutting head 10 of a drilling cutting tool 12 (shown in FIGS. 7, 9 and 11) in accordance with the present invention. The cutting head 10 may be manufactured by form-pressing and sintering carbide powders or by injection molding techniques. The cutting head 10 has a longitudinal axis A and comprises a cutting head forward end 14, a cutting head rear end 16 distal the cutting head forward end 14 and a peripheral surface 18 therebetween. It is understood that terms used throughout the specification, such as "forward", "rearward" and the like, are used for description purposes only and are not intended to limit the scope of the invention as hereinafter claimed.

Two diametrically opposite major guiding segments 20 extend from the longitudinal axis A and from the cutting head forward end 14 to the cutting head rear end 16. The major guiding segments 20 join at a cutting head central portion 22 that has a central portion base surface 24 at the cutting head rear end 16 thereof.

Each of the two major guiding segments 20 comprises, at the cutting head forward end 14, a cutting edge 26 that extends from a forward end center zone 28 of the cutting head 10 to the peripheral surface 18. A radially outermost end 30 of the cutting edge 26 that is distanced the largest radial distance from the longitudinal axis A defines a cutting radius R. A cutting diameter D is defined as twice the cutting radius R. Each cutting edge 26 is formed at the intersection of a rake surface 32 that extends generally axially rearwardly therefrom and a relief surface 34 that extends tangentially behind the cutting edge 26.

Figure 4:
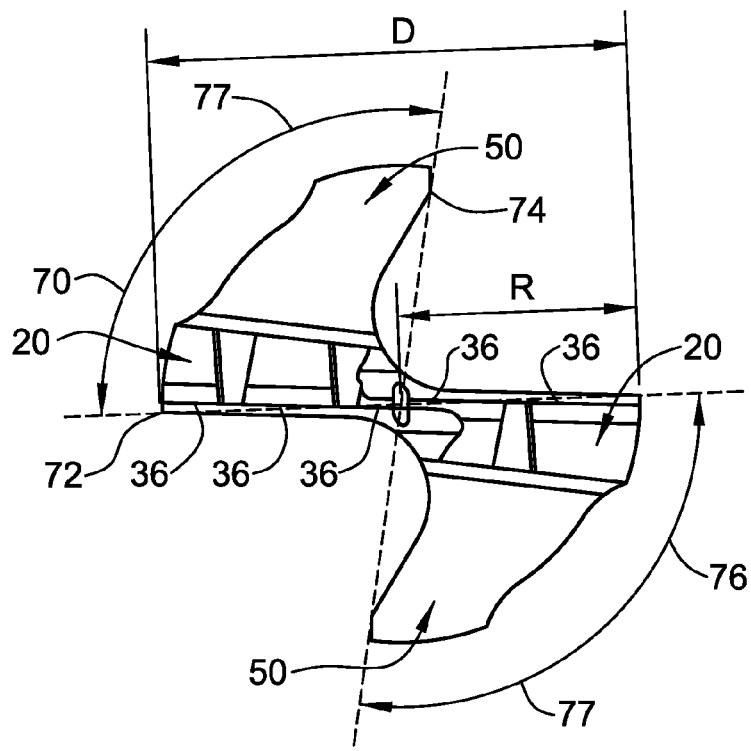
FIG. 4 is a front view of the cutting head of FIG. 1.

A tangential direction is defined as a direction generally perpendicular to a radial direction when viewed in a front view of the cutting head 10. Therefore, a tangentially forwardly direction, as may be understood in FIG. 4, is every direction that is generally perpendicular to a radial direction and is in a counterclockwise direction.

Each of the two cutting edges 26 comprises cutting edge segments 36 that are co-linear and spaced apart from each other by chip splitting sections 38. The cutting head 10 is non-symmetrical in that the two cutting edges 26 are non-identical. The two cutting edges 26 differ by the lengths of their cutting edge segments 36 and by the radial location of their chip splitting sections 38, the only condition being that there is radial overlap between cutting edge segments 36 of one cutting edge 26 with those of the other cutting edge 26 when the cutting head 10 is rotated around the axis A. The cutting edges 26 may extend from the longitudinal axis A to the peripheral surface 18.

The cutting head 10 is thus formed asymmetrically with respect to the longitudinal axis A in the sense that, in a top view thereof (See FIG. 4), only a 360° rotation (or a multiple thereof) around the longitudinal axis A returns the cutting head to the same rotational orientation.

A chip breaker 40 extends generally axially rearwardly from a rear end 42 of the rake surface 32. The chip breaker 40 may be slanted axially rearwardly and tangentially forwardly with respect to the cutting edge 26. The chip breaker 40 is formed integrally with the cutting head 10 and may be axially rearwardly and tangentially forwardly curved or have any other desired shape. Thus, it is ensured that the chips produced during a drilling operation will break properly for easy evacuation thereof.

A major guiding pad 44 is formed in the periphery of each of the major guiding segments 20 and is associated with an adjacent cutting edge 26. The major guiding pad 44 has a major guiding pad forward end 46, lying on a cylindrical envelope defined by the cutting diameter D, and a major guiding pad rear end 48 axially distal therefrom. The major guiding pad forward end 46 may lie in its entirety on the cylindrical envelope, or, may be slightly relieved therefrom in a tangentially rearwardly direction. Each major guiding pad forward end 46 joins the associated cutting edge 26 at the radially outermost end 30 of the cutting edge. The major guiding pads 44 are integrally formed with the cutting head 10 thereby enabling an increase in the accuracy of the surface finish of major guiding pads 44 since only one setting of a grinding machine may be required in order to perform peripheral grinding, or other finishing methods, of the major guiding pads 44. Furthermore, such a construction enables reducing the production cost of the cutting head 10. Typically, the major guiding pads 44 lie on a cylindrical envelope having a diameter equal to the cutting diameter D. Alternatively, the major guiding pads 44 taper rearwardly at an angle of 0° to 1° with respect to the longitudinal axis A.

Figure 5:
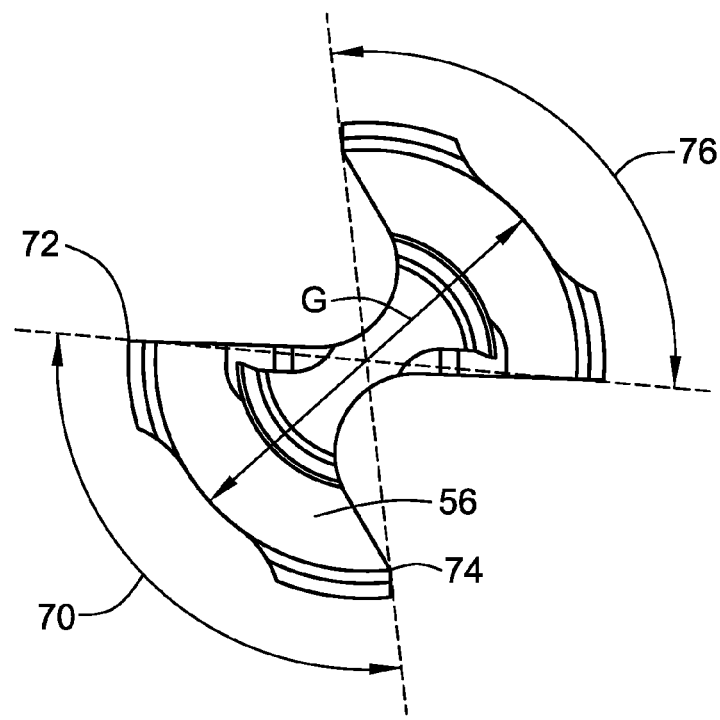
FIG. 5 is a rear view of the cutting head of FIG. 1.

A minor guiding segment 50 extends circumferentially behind each major guiding segment 20 and is circumferentially separated therefrom. Each minor guiding segment 50 comprises a minor guiding pad 52 at the periphery thereof. A forward end of the minor guiding pad 52 constitutes a minor pad forward end 54 that, according to a specific embodiment of the present invention, lies axially rearwardly with respect to the major guiding pad forward end 46. The minor guiding pad 52 extends rearwardly in a similar manner to the major guiding pad 44, i.e., it may lay on a cylindrical envelope having a diameter equal to the cutting diameter D or may taper rearwardly at an angle of 0° to 1° with respect to the longitudinal axis A. Furthermore, the minor pad forward end 54 may lie in its entirety on the cylindrical envelope, or, may be slightly relieved therefrom in a tangentially rearwardly direction. Each major guiding segment 20 and its associated minor guiding segment 50 comprise, at a rearmost end thereof, a cutting head rear surface 56. As shown in FIG. 5, the cutting head rear surface 56 has a cutting head rear surface diameter G.

A leading face 58 of each major guiding segment 20 extends from the cutting head central portion 22 and joins an associated major guiding pad 44 at a leading edge line 60. The leading face 58 of each major guiding segment 20 may be planar. Alternatively, the leading faces 58 may be curved. A trailing face 62 of each major guiding segment 20 is concave and joins the leading face 58 of the other major guiding segment 20 at the cutting head central portion 22.

A trailing face 64 of each minor guiding segment 50 joins, at an inward portion thereof, the adjacent trailing face 62 of the preceding major guiding segment 20. The trailing face 64 of each minor guiding segment 50 joins, at an outward portion thereof, the associated minor guiding pad 52. As seen in FIG. 1, the trailing face 64 of a given minor guiding segment 50 may be formed from a first portion 66, adjacent the associated minor guiding pad 52, and from a second portion 68, adjacent and radially inwardly with respect to the first portion 66, and transversely directed thereto. Each second portion 68 may be larger than its adjacent first portion 66. However, the trailing face 64 of a minor guiding segment 50 does not have to be formed from two portions, and it may be formed from one or more portions as required by the design.

As shown in FIGS. 4 and 5, a first head circular extension 70 of the cutting head 10 is defined between a leading circumferential extremity 72 of a first major guiding segment 20 and a trailing circumferential extremity 74 of an associated minor guiding segment 50 that lay on a circle having a diameter similar to the cutting head rear surface diameter G. In a similar manner, a second head circular extension 76 of the cutting head 10 is defined between a leading circumferential extremity 72 of a second major guiding segment 20 and a trailing circumferential extremity 74 of an associated minor guiding segment 50. The first head circular extension 70 and the second head circular extension 76 together form a combined head circular extension 77 of the cutting head 10.

In order to improve the flow of chips together with the cooling agent and increase the efficiency of chips removal when the cutting head 10 is used during machining of a workpiece, the lower portion of each major guiding segment is provided with a recess 78 that is located near the longitudinal axis A. Each recess 78 joins at a rearmost end thereof the central portion base surface 24 at a recess base line 80 and is axially forwardly and tangentially forwardly curved with respect to the central portion base surface 24.

Figure 6:
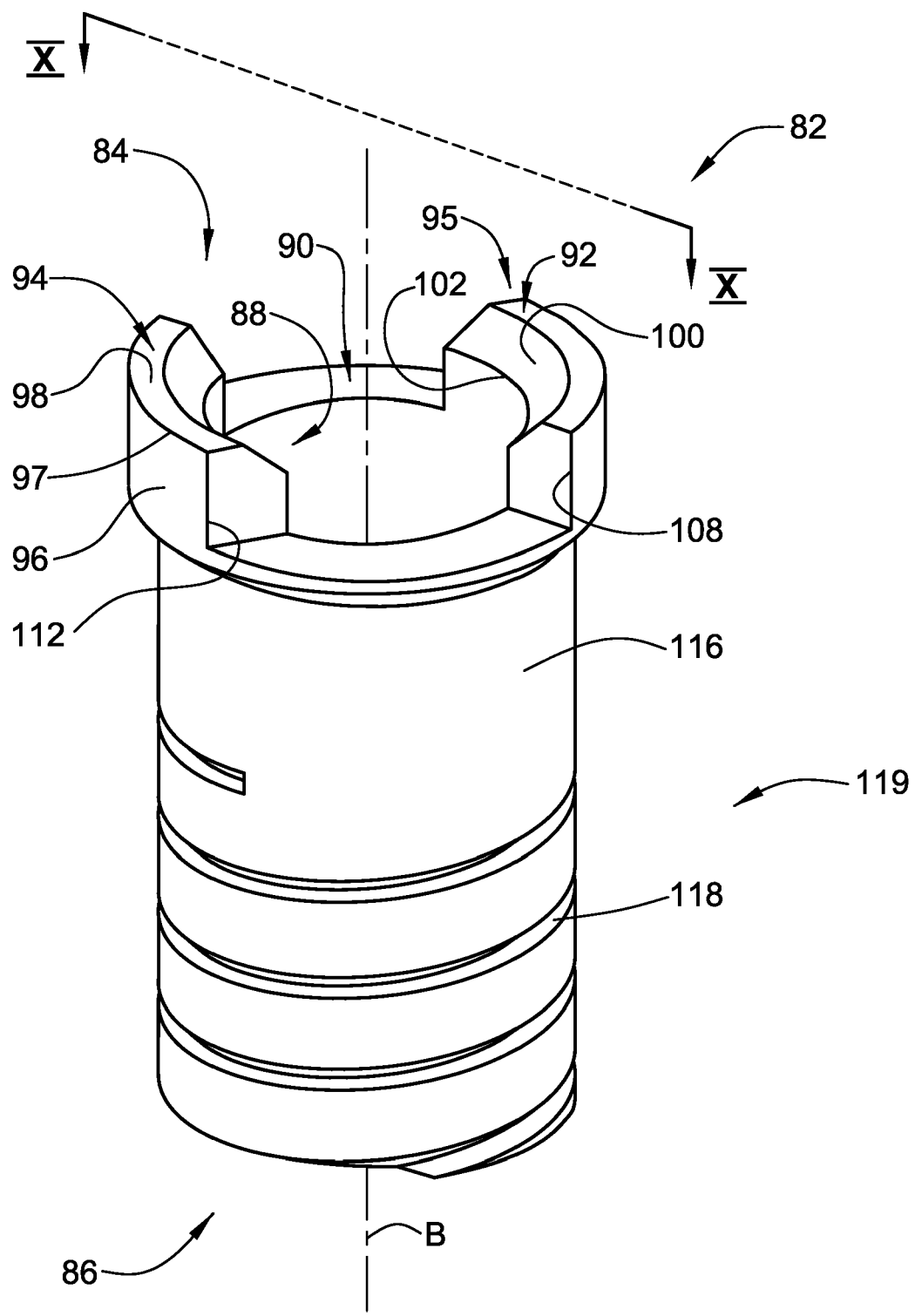
FIG. 6 is a perspective view of a shank for the cutting head of FIG. 1.
Figure 8:
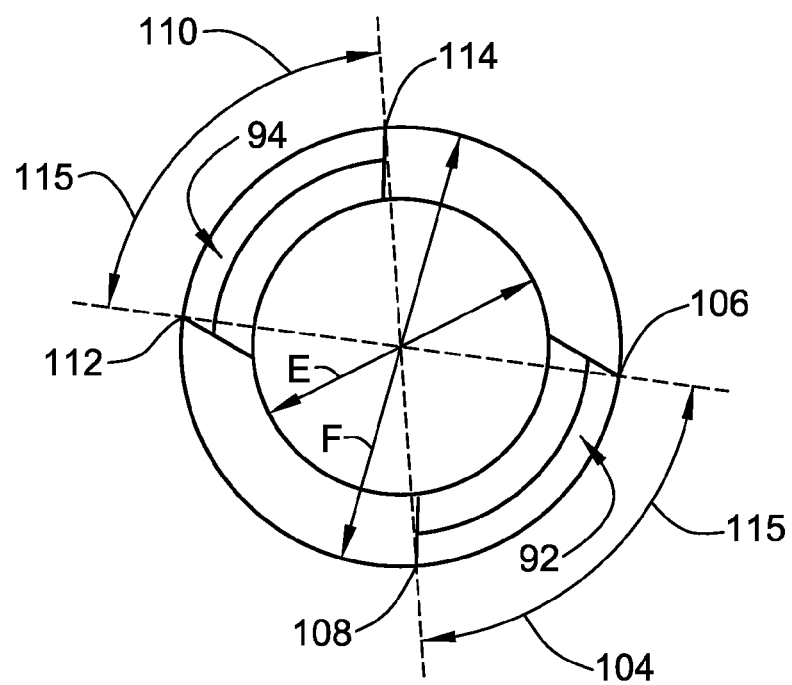
FIG. 8 is a front view of the shank of FIG. 6.
Figure 10:
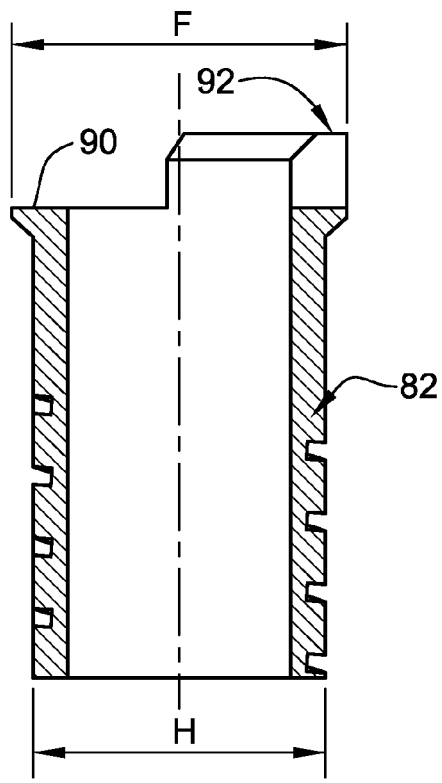
FIG. 10 is a cross-sectional view of the shank of FIG. 6 taken along line X-X in FIG. 6.

As shown in FIGS. 6, 8 and 10, the shank 82 of the drilling cutting tool 12 has a generally cylindrical shape having a longitudinal axis B. The shank has a forward end 84, a rear end 86 and a through bore 88, having a bore diameter E, extending from the shank forward end 84 to the shank rear end 86. The forward end 84 of the shank 82 has a forwardly facing annular ring 90 having a ring external diameter F and a ring internal diameter similar to the bore diameter E.

The annular ring 90 is provided with a first forwardly projecting projection 92 and a second forwardly projecting projection 94 diametrically opposite the first projection 92. The annular ring 90 and the projections 92, 94 projecting forwardly thereof constitute a forward engagement portion 95 of the shank 82. Each of the projections 92, 94 is formed with a peripheral cylindrical surface 96 having a diameter equal to the ring external diameter F. A forward end 97 of each peripheral cylindrical surface joins a forward bridging section 98. Each forward bridging section 98 may be flat as shown, or, may be reduced to a small convex portion that joins between each peripheral cylindrical surface 96 and an inlet surface 100. Each inlet surface 100 slopes radially inwardly and axially rearwardly from the associated forward bridging section 98. An innermost end 102 of each inlet surface 100 joins the through bore 88. In one embodiment, each inlet surface 100 is conical. Alternatively, each inlet surface may be concave or convex.

Figure 9:
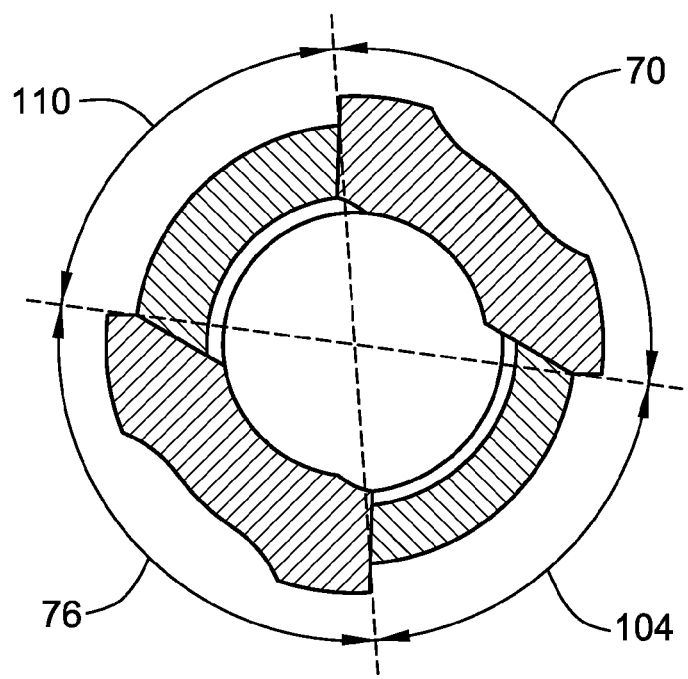
FIG. 9 is a cross-sectional view of the cutting tool of FIG. 7 taken along line IX-IX in FIG. 11.

As shown in FIGS. 8 and 9, a first shank circular extension 104 is defined between a leading circumferential extremity 106 of the first projection 92 and a trailing circumferential extremity 108 of the first projection 92, when the extremities lay on a circle having a diameter similar to the ring external diameter F. In a similar manner, a second shank circular extension 110 is defined between a leading circumferential extremity 112 of the second projection 94 and a trailing circumferential extremity 114 of the second projection. The first shank circular extension 104 and the second shank circular extension 110 together form a combined shank circular extension 115.

The rear portion of the shank 82 is formed from an elongated cylindrical body 116 that extends rearwardly from the annular ring 90. The cylindrical body 116 has an external diameter H that is smaller than the ring external diameter F. The cylindrical body 116 is formed with an external thread 118 that constitutes a rear engagement portion 119 of the shank 82.

Figure 7:
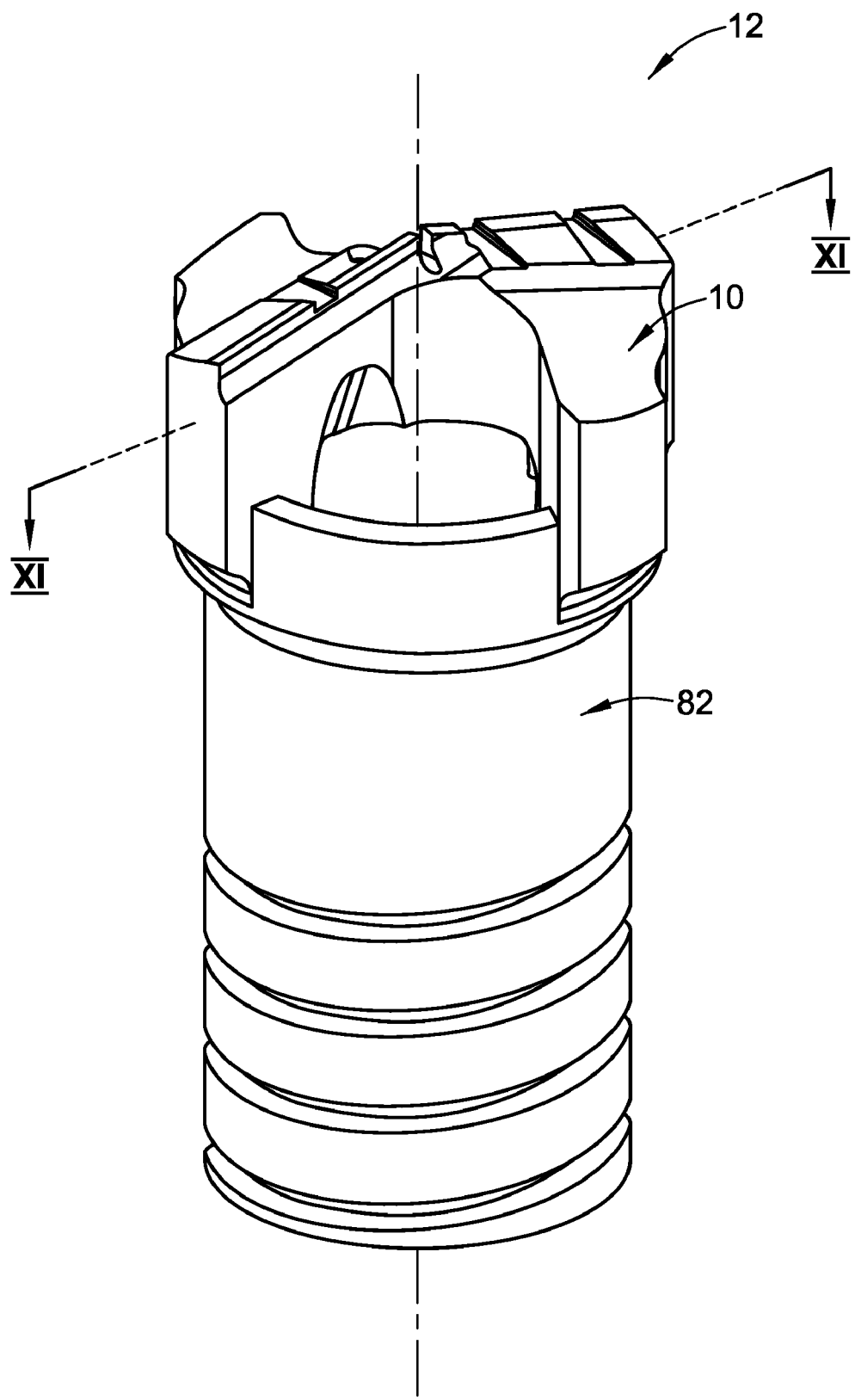
FIG. 7 is a perspective view of a cutting tool comprising the cutting head of FIG. 1 and the shank of FIG. 6.
Figure 11:
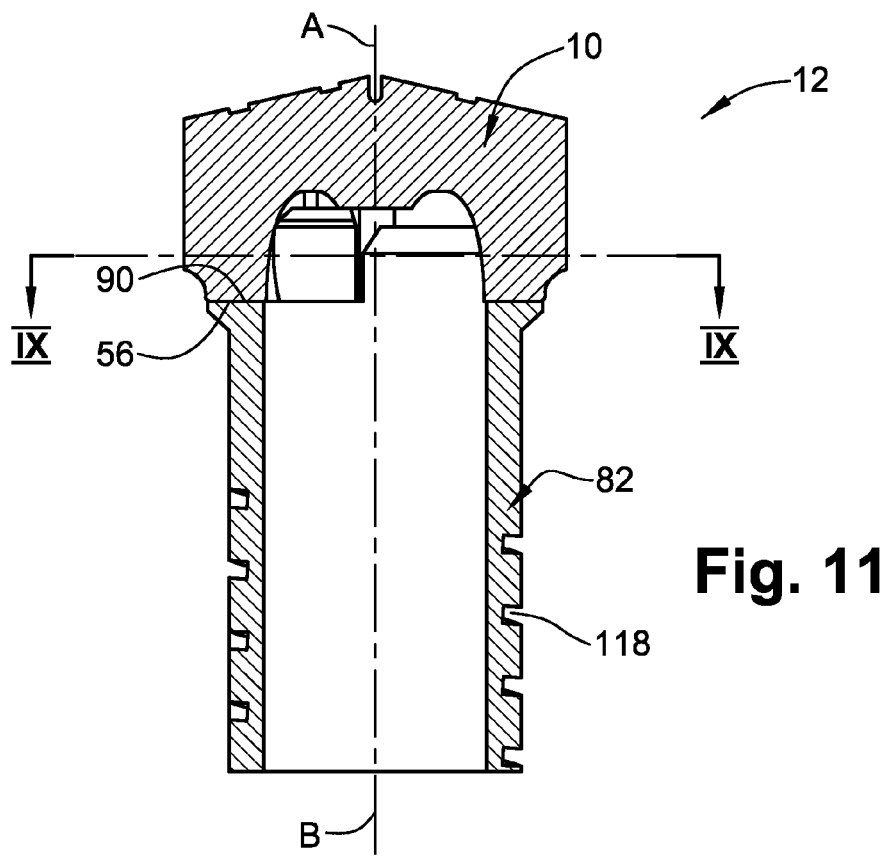
FIG. 11 is a cross-sectional view of the cutting tool of FIG. 7 taken along line XI-XI in FIG. 7.
Figure 12:
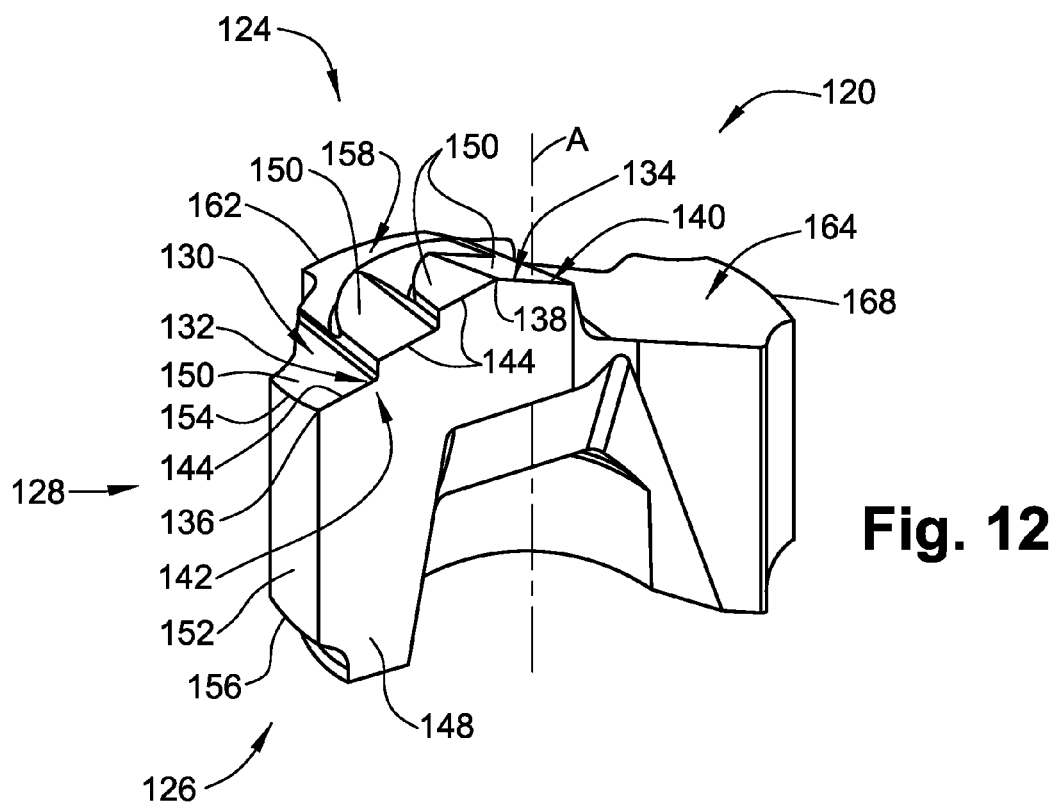
FIG. 12 is a perspective view of a second embodiment of a cutting head in accordance with the present invention.
Figure 13:
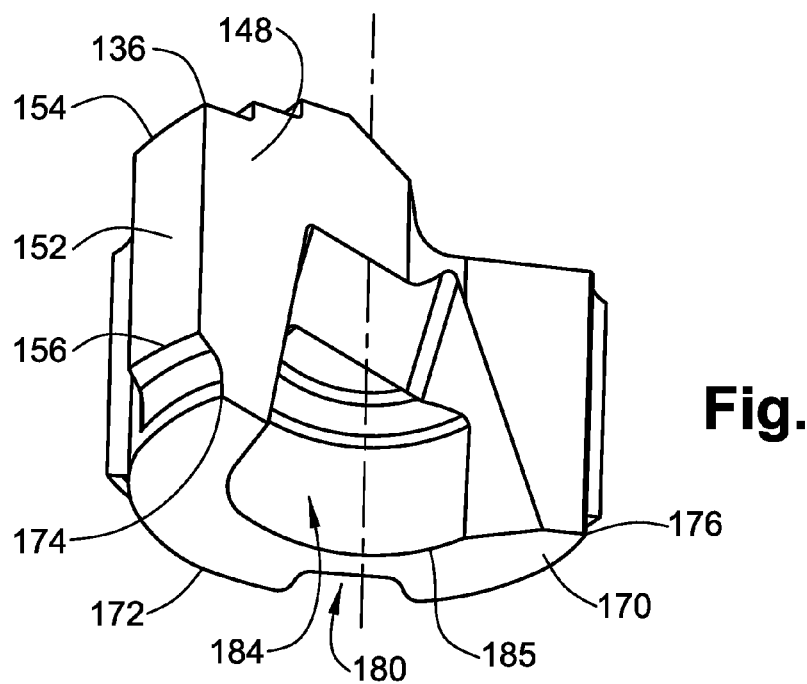
FIG. 13 is a rear perspective view of the cutting head of FIG. 12.
Figure 14:
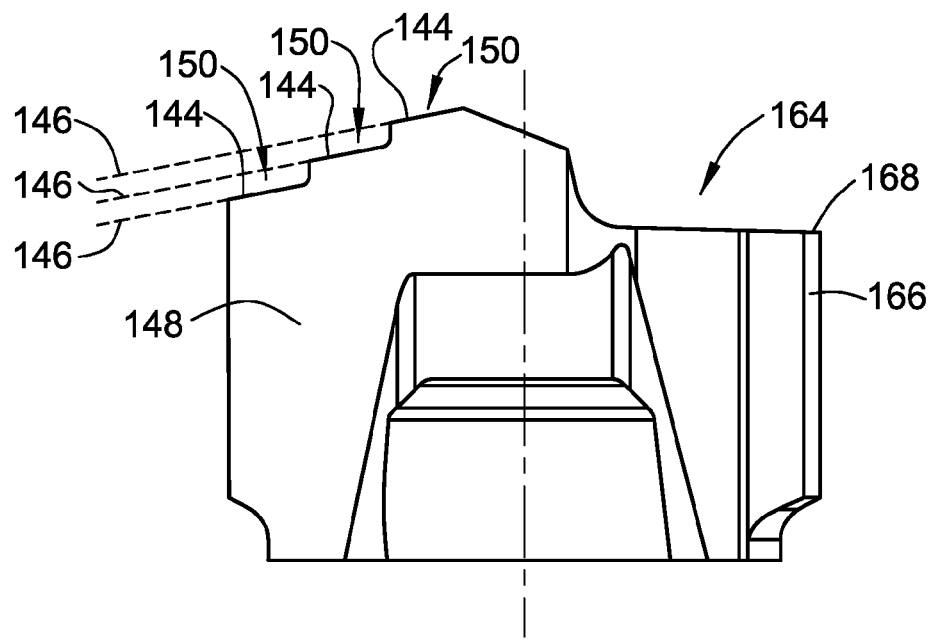
FIG. 14 is a first side view of the cutting head of FIG. 12.
Figure 15:
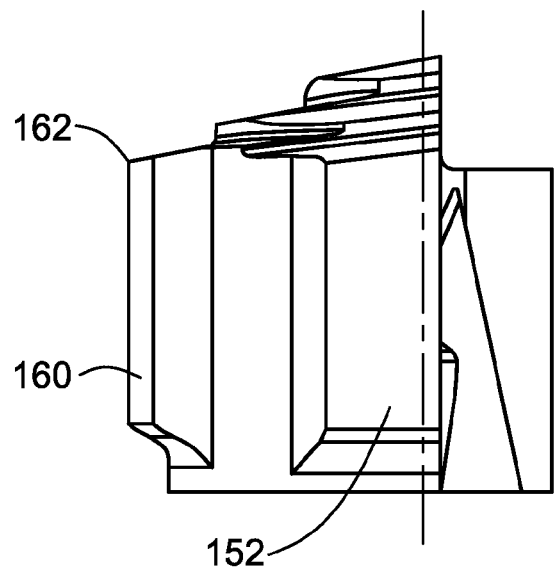
FIG. 15 is a second side view of the cutting head of FIG. 12.
Figure 16:
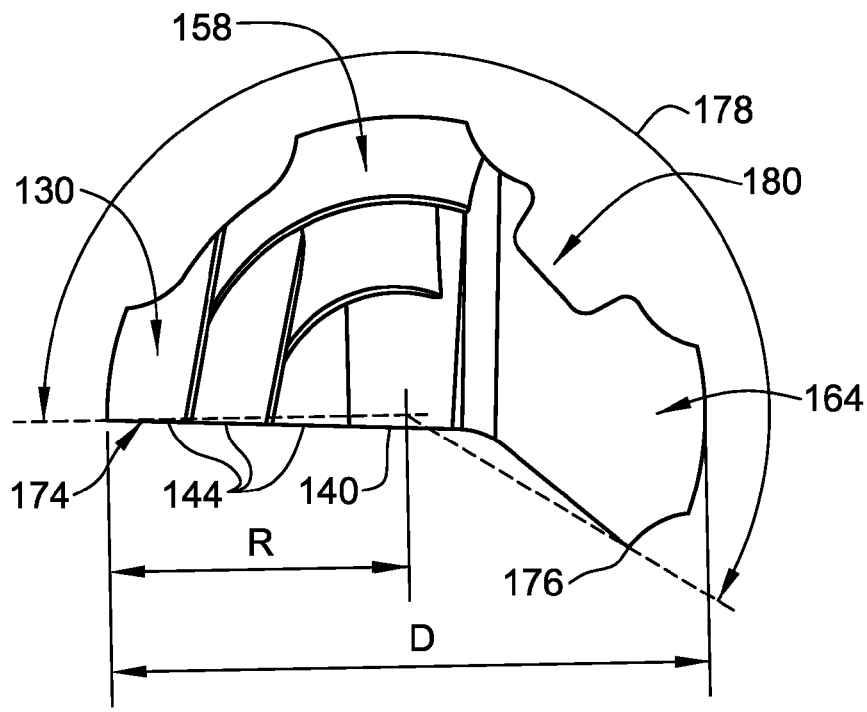
FIG. 16 is a front view of the cutting head of FIG. 12.

In order to form a drilling cutting tool 12, the cutting head 10 is put onto the shank 82 such that the longitudinal axis A of the cutting head 10 coincides with the longitudinal axis B of the shank 82. In that position, the cutting head rear surface 56 abuts the annular ring 90 of the shank 82, the guiding segments 20, 50 of the cutting head mate with the forwardly projecting projections 92, 94 of the shank, and the shank circular extension is complementary to the head circular extension as shown in FIG. 9. At this stage, the cutting head 10 and the shank 82 are brazed together thus forming a drilling cutting tool as shown in FIGS. 7, 9 and 11. The mutual construction of the cutting head 10 and the shank 82 ensures adequate stress distribution and torque transmission, in addition to the fact that the cutting head 10 and the shank 82 are brazed together.

In order to use the drilling cutting tool 12, the external thread 118 of the cylindrical body 116 is engaged into an internal thread formed in a forward end of an extension rod (not shown). Thus, the drilling cutting tool 12 according to the present invention can be used for deep hole drilling.

Figure 23:
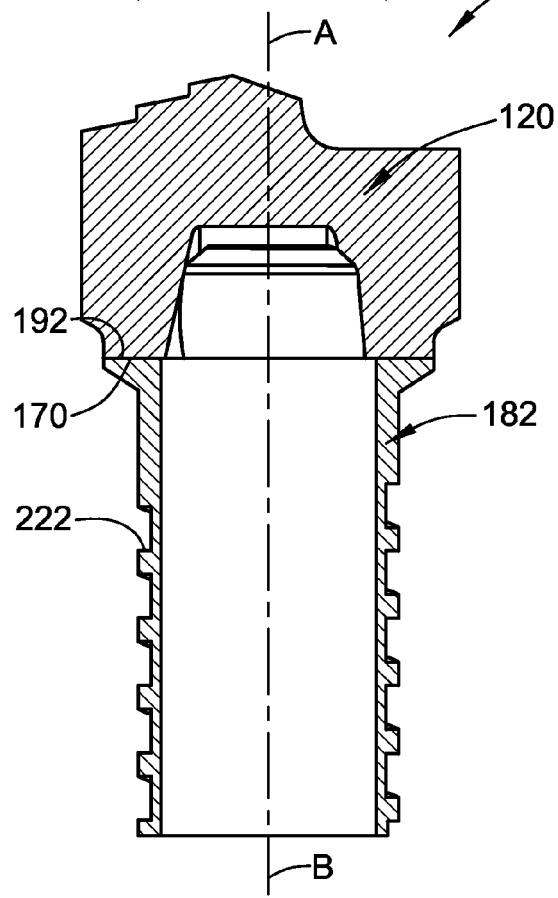
FIG. 23 is a cross-sectional view of the cutting tool of FIG. 19 taken along line XXIII-XXIII in FIG. 19.

Attention is now drawn to FIGS. 12 to 17 that show another embodiment of a cutting head 120 of a drilling cutting tool 122 (shown in FIGS. 19, 21, 23) according to the present invention. According to this embodiment, the cutting head 120 has a longitudinal axis A and comprises a cutting head forward end 124, a cutting head rear end 126 distal the cutting head forward end 124 and a peripheral surface 128 therebetween.

A major guiding segment 130 extends from the longitudinal axis A. The major guiding segment 130 extends from the cutting head forward end 124 to the cutting head rear end 126. The major guiding segment 130 comprises, at the cutting head forward end 124, a cutting edge 132 that extends from a forward end center zone 134 of the cutting head 120 to the peripheral surface 128. A radially outermost end 136 of the cutting edge 132 that is distanced the largest radial distance from the longitudinal axis A defines a cutting radius R. A cutting diameter D is defined as twice the cutting radius R.

The cutting head 120 may be used particularly for deep hole drilling of relatively small diameters. Therefore, for practical reasons, it is provided with only one cutting edge 132. A forwardmost end 138 of the cutting edge 132 divides the cutting edge into a central portion cutting edge 140 and an external portion cutting edge 142. The central portion cutting edge 140 extends along opposite sides of the longitudinal axis A. The external portion cutting edge 142 comprises cutting edge segments 144 that are co-planar and lay on imaginary cutting edge lines 146 that are spaced apart from each other. A leading face 148 of the major guiding segment 130 functions as a rake surface of the cutting edge. The leading face 148 may be planar or have any other shape as required by the design. Each of the cutting edge segments 144 has a relief surface segment 150 extending tangentially behind therefrom. The division of the cutting edge 132 into cutting edge segments 144 enables splitting of the chips produced during a cutting operation.

The cutting head 120 is thus formed asymmetrically with respect to the longitudinal axis A in the sense that, in a top view thereof (See FIG. 16), only a 360° rotation (or a multiple thereof) around the longitudinal axis A returns the cutting head to the same rotational orientation.

A major guiding pad 152 is formed in the periphery of the major guiding segment 130. The major guiding pad 152 has a major guiding pad forward end 154, lying on a cylindrical envelope defined by the cutting diameter D, and a major guiding pad rear end 156 axially distal therefrom. The major guiding pad forward end 154 joins the cutting edge 132 at the radially outermost end 136 of the cutting edge. Typically, the major guiding pad 152 lies on a cylindrical envelope having a diameter equal to the cutting diameter D. Alternatively, the major guiding pad 152 tapers rearwardly at an angle of 0° to 1° with respect to the longitudinal axis A. The major guiding pad forward end 154 may lie in its entirety on the cylindrical envelope, or, may be slightly relieved therefrom in a tangentially rearwardly direction.

A minor guiding segment 158 extends circumferentially behind the major guiding segment 130 and is circumferentially separated therefrom. The minor guiding segment 158 comprises a minor guiding pad 160 at the periphery thereof. A forward end of the minor guiding pad constitutes a minor guiding pad forward end 162 that may lay axially similarly with respect to the major guiding pad forward end 154. The minor guiding pad 160 extends rearwardly in a similar manner like the major guiding pad 152, i.e., it may lay on a cylindrical envelope having a diameter equal to the cutting diameter D or may taper rearwardly at an angle of 0° to 1° with respect to the longitudinal axis A. Furthermore, the minor guiding pad forward end 162 may lie in its entirety on the cylindrical envelope, or, may be slightly relieved therefrom in a tangentially rearwardly direction.

A support guiding segment 164 extends circumferentially behind the minor guiding segment 158 and is circumferentially separated therefrom. The support guiding segment 164 comprises a support guiding pad 166 at the periphery thereof. A forward end of the support guiding pad 166 constitutes a support guiding pad forward end 168 that may lay axially rearwardly with respect to the major guiding pad forward end 154. The support guiding pad 166 extends rearwardly in a similar manner like the major guiding pad 152, i.e., it may lay on a cylindrical envelope having a diameter equal to the cutting diameter D or may taper rearwardly at an angle of 0° to 1° with respect to the longitudinal axis A. Furthermore, the support guiding pad forward end 168 may lie in its entirety on the cylindrical envelope, or, may be slightly relieved therefrom in a tangentially rearwardly direction.

Figure 17:
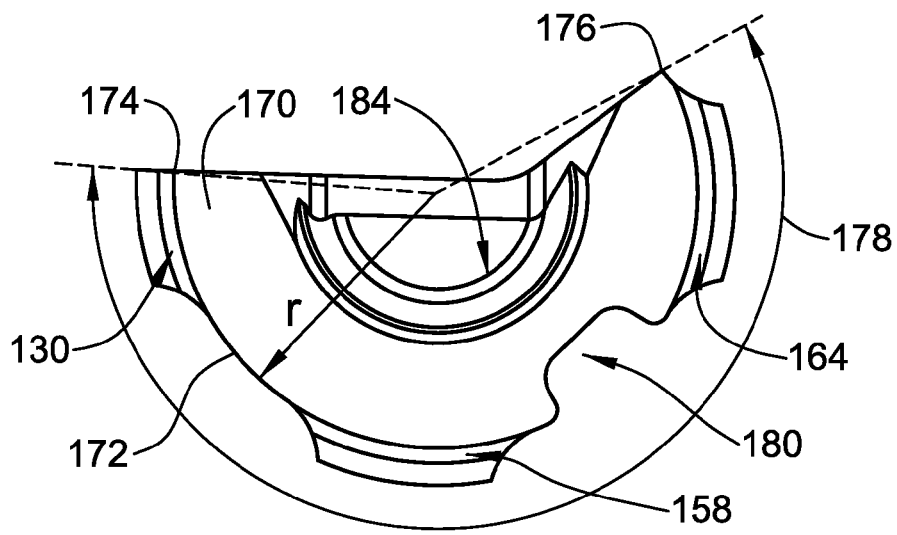
FIG. 17 is a rear view of the cutting head of FIG. 12.

A mutual rear surface 170 joins the rear ends of the major guiding segment 130, of the minor guiding segment 158 and of the support guiding segment 164. Typically, the rear surface 170 is planar. However, the rear surface 170 may have other form according to design requirements. The circumferential extremity 172 of the rear surface 170 is formed on an arc having a rear surface radius r and has a leading circumferential extremity 174, axially rearwardly to the major guiding segment 130, and a trailing circumferential extremity 176, axially rearwardly to the support guiding segment 164. As shown in FIG. 17, a head circular extension 178 is defined between the leading circumferential extremity 174 of the rear surface 170 and the trailing circumferential extremity 176 of the rear surface 170.

The peripheral surface 128 of the cutting head 120 between the minor guiding segment 158 and the support guiding segment 164 is provided with a slot 180 that extends from the cutting head forward end 124 to the cutting head rear end 126. The slot 180 assists to assure the proper positioning of the cutting head 120 prior to its fixedly brazing to a shank 182. Furthermore, the slot 180 provides better torque transfer between the cutting head 120 and the shank 182.

In order to improve the flow of chips together with the cooling agent and increase the efficiency of chips removal when the cutting head 120 is used during machining of a workpiece, the lower central portion of the cutting head 120 is provided with a recess 184. The recess 184 joins at a rearmost end 185 thereof the rear surface 170 of the cutting head 120.

Figure 18:
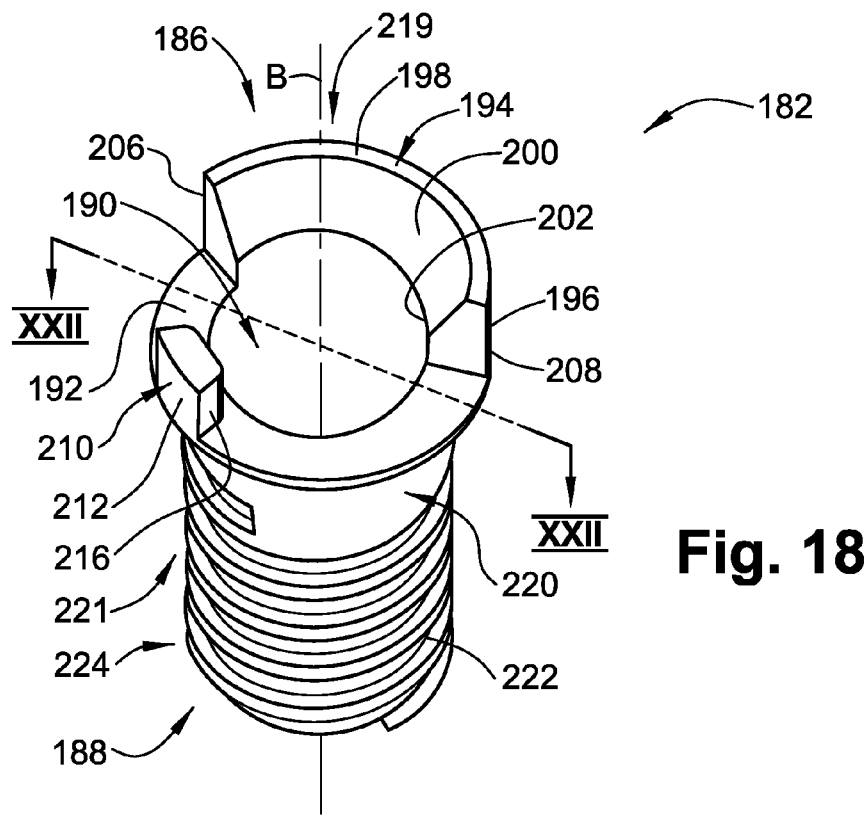
FIG. 18 is a perspective view of a shank for the cutting head of FIG. 12.
Figure 19:
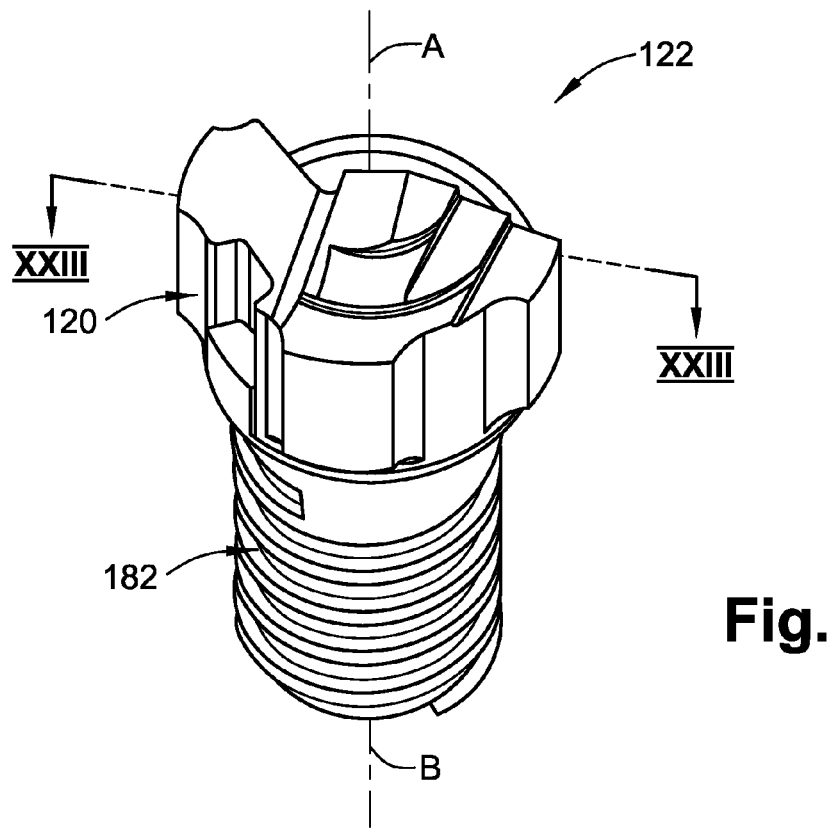
FIG. 19 is a perspective view of a cutting tool comprising the cutting head of FIG. 12 and the shank of FIG. 18.
Figure 20:
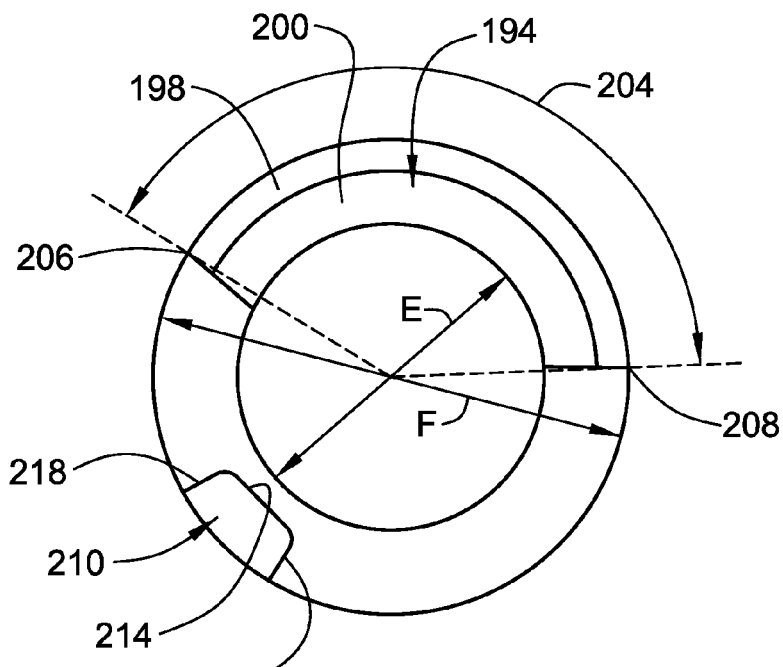
FIG. 20 is a front view of the shank of FIG. 18.

As shown in FIGS. 18 and 20, the shank 182 of the drilling cutting tool 122 (shown in FIGS. 19, 21 and 23) has a generally cylindrical shape having a longitudinal axis B. The shank 182 has a forward end 186, a rear 188 end and a through bore 190, having a bore diameter E, extending from the shank forward end 186 to the shank rear end 188. The forward end 186 of the shank has a forwardly facing annular ring 192 having a ring external diameter F and a ring internal diameter similar to the bore diameter E.

The annular ring 192 is provided with a first forwardly projecting projection 194. The first projection 194 has a peripheral cylindrical surface 196 having a diameter equal to the ring external diameter F. A forward end of the peripheral cylindrical surface 196 joins a forward bridging section 198. The forward bridging section 198 may be flat as shown, or, may be reduced to a small convex portion that joins between the peripheral cylindrical surface 196 and an inlet surface 200. The inlet surface 200 slopes radially inwardly and axially rearwardly from the forward bridging section 198. An innermost end 202 of the inlet surface 200 joins the through bore 190. In one embodiment, the inlet surface 200 is conical. Alternatively, the inlet surface 200 may be concave or convex.

Figure 21:
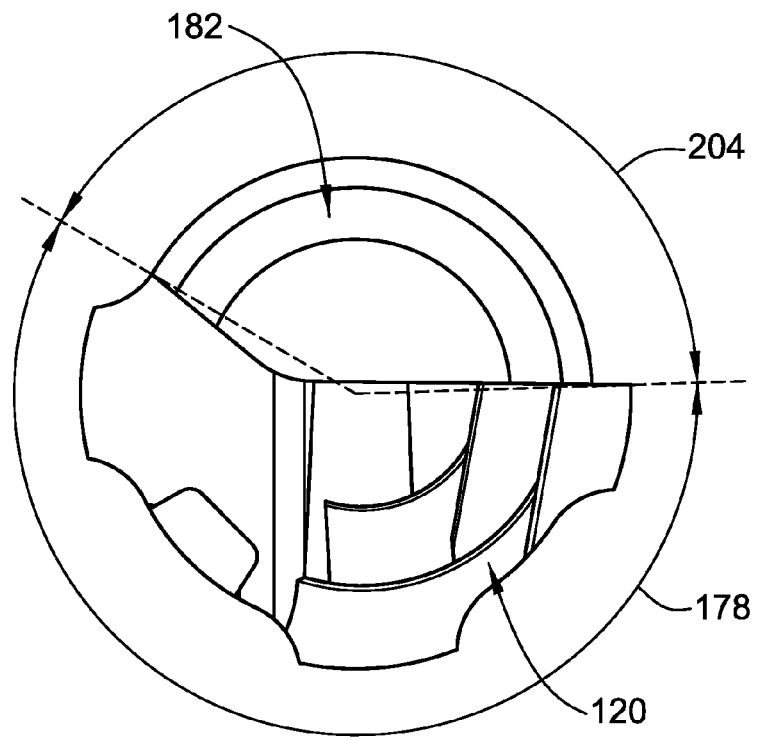
FIG. 21 is a front view of the cutting tool of FIG. 19.
Figure 22:
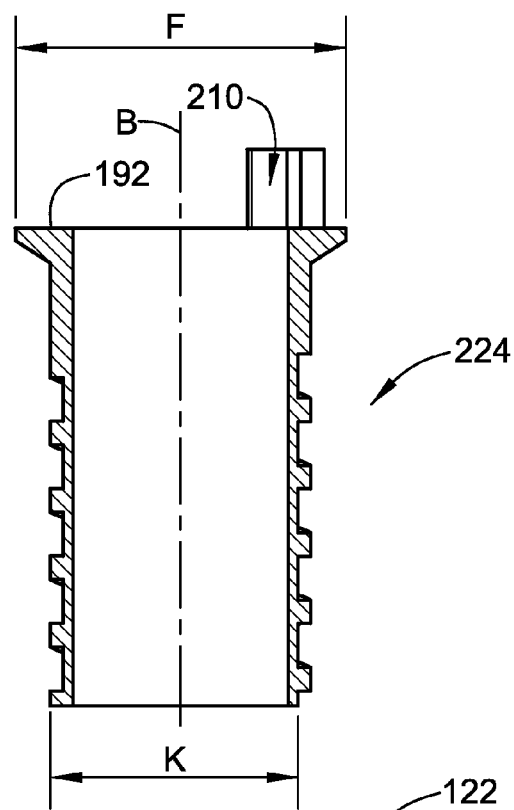
FIG. 22 is a cross-sectional view of the shank of FIG. 18 taken along line XXII-XXII in FIG. 18.

As shown in FIGS. 20 and 21, a shank circular extension 204 is defined between a leading circumferential extremity 206 of the first projection 194 and a trailing circumferential extremity 208 of the first projection 194. The annular ring 192 is further provided with a second forwardly projecting projection 210 that is located generally diametrically opposite the first projection 194. The second projection 210 has a peripheral cylindrical surface 212 lying on a cylindrical envelope having a diameter equal to the ring external diameter F, an inner surface 214, opposite the peripheral surface 212, and a pair of leading 216 and trailing 218 surfaces extending between the peripheral surface 212 and the inner surface 214. The shapes and sizes of the inner surface 214 and the leading 216 and trailing 218 surfaces of the second projection 210 mate with the shapes and sizes of the slot 180 provided in the cutting head 120 between the minor guiding segment 158 and the support guiding segment 164. The annular ring 192 and the projections 194, 210 projecting forwardly thereof constitute a forward engagement portion 219 of the shank 182.

The rear portion 221 of the shank 182 is formed from an elongated cylindrical body 220 that extends rearwardly from the annular ring 192. The cylindrical body 220 has an external diameter K that is smaller than the ring external diameter F. The cylindrical body 220 is formed with an external thread 222 that constitutes a rear engagement portion 224 of the shank 182.

In order to form a drilling cutting tool 122, the cutting head 120 is put onto the shank 182 such that the longitudinal axis A of the cutting head 120 coincides with the longitudinal axis B of the shank 182. In that position, the rear surface 170 of the cutting head 120 abuts the annular ring 192 of the shank 182, the second projection 210 of the shank 182 mates with the slot 180 of the cutting head 120, and the shank circular extension 204 is complementary to the head circular extension 178 as shown in FIGS. 19 and 21. At this stage, the cutting head 120 and the shank 182 are brazed together thus forming a drilling cutting tool 122.

In order to use the drilling cutting tool 122, the external thread 222 of the cylindrical body 220 is engaged into an internal thread formed in a forward end of an extension rod (not shown). Thus, the drilling cutting tool 122 according to the present invention can be used for deep hole drilling.

Although the present invention has been described to a certain degree of particularity, it should be understood that various alterations and modifications could be made without departing from the spirit or scope of the invention as hereinafter claimed. For example, the cutting head of the present invention is not limited to drilling operations, and it may be modified to perform other metal cutting operations. The leading face of the major guiding segment of the cutting head that has only one cutting edge may comprise a chip breaker. The engagement between the cutting head and the shank may have other geometries between the guiding segments of the cutting head and the forwardly protruding protrusions of the shank.

What is claimed is:

1. A cutting head (10, 120) formed asymmetrically with respect to a longitudinal axis (A) and comprising:
   a cutting head forward end (14, 124), a cutting head rear end (16, 126) distal the cutting head forward end (14, 124) and a peripheral surface (18, 128) therebetween,
   at least one major guiding segment (20, 130) extending from the cutting head forward end (14, 124) to the cutting head rear end (16, 126) and terminating in a cutting head rear surface (56, 170) which forms the rearmost end of both the at least one major guiding segment (20, 130) and also the entire cutting head, the at least one major guiding segment (20, 130) comprising at the cutting head forward end a cutting edge (26, 132) that extends from a forward end center zone (28, 134) of the cutting head to the peripheral surface, a radially outermost end (30, 136) of the cutting edge defines a cutting diameter (D), the cutting edge has a rake surface (32, 148) extending rearwardly therefrom,
   a major guiding pad (44, 152) associated with the cutting edge, the major guiding pad having a guiding pad forward end (46, 154), lying on a cylindrical envelope defined by the cutting diameter (D), and a guiding pad rear end (48, 156) axially distal therefrom, the guiding pad forward end joins the cutting edge at the radially outermost end of the cutting edge, wherein:
   the cutting head (10, 120) comprises sintered carbide powders; and
   the guiding pad (44, 152) is integrally formed with the cutting head to have unitary one-piece construction.

2. The cutting head (10, 120) according to claim 1, wherein the guiding pad tapers rearwardly at an angle of 0° to 1° with respect to the longitudinal axis (A).

3. The cutting head (10, 120) according to claim 1, further comprising a minor guiding segment (50, 158) which is circumferentially separated from the major guiding segment (20, 130), the minor guiding segment comprises a minor guiding pad (52, 160) at a circumferential portion thereof.

4. The cutting head (120) according to claim 3, further comprising a support guiding segment (164) which is circumferentially separated from the minor guiding segment (158), the support guiding segment comprises a support guiding pad (166) at a circumferential portion thereof.

5. The cutting head (10) according to claim 1, wherein the cutting edge (26) comprises a plurality of cutting edge segments (36) that are spaced apart from each other.

6. The cutting head (10) according to claim 5, wherein the plurality of cutting edge segments (36) are co-linear.

7. The cutting head (120) according to claim 1, wherein the cutting edge (132) comprises cutting edge segments (144) that lay on imaginary cutting edge lines (146) that are spaced apart from each other.

8. The cutting head (10) according to claim 1, further comprising a chip breaker (40) extending rearwardly from a rear end (42) of the rake surface (32), wherein the chip breaker is slanted axially rearwardly and tangentially forwardly with respect to the cutting edge (26).

9. The cutting head (10) according to claim 8, wherein the chip breaker (40) is axially rearwardly and tangentially forwardly curved with respect to the cutting edge (26).

10. The cutting head (10) according to claim 1, wherein a lower portion of a major guiding segment (20) is provided with a recess (78) that is axially forwardly and tangentially forwardly curved.

11. A cutting head (120) formed asymmetrically with respect to a longitudinal axis (A) and comprising:
   a cutting head forward end (124), a cutting head rear end (126) distal the cutting head forward end (124) and a peripheral surface (128) therebetween,
   at least one major guiding segment (130) extending from the cutting head forward end (124) to the cutting head rear end (126), the at least one major guiding segment (130) comprising at the cutting head forward end a cutting edge (132) that extends from a forward end center zone (134) of the cutting head to the peripheral surface, a radially outermost end (136) of the cutting edge defines a cutting diameter (D), the cutting edge has a rake surface (148) extending rearwardly therefrom, a major guiding pad (152) associated with the cutting edge, the major guiding pad having a guiding pad forward end (154), lying on a cylindrical envelope defined by the cutting diameter (D), and a guiding pad rear end (156) axially distal therefrom, the guiding pad forward end joins the cutting edge at the radially outermost end of the cutting edge, wherein:

the cutting head (120) comprises sintered carbide powders;

the guiding pad (44) is integrally formed with the cutting head to have unitary one-piece construction; and the peripheral surface (128) is provided with a locating slot (180) that extends from the cutting head forward end (124) to the cutting head rear end (126).

12. The cutting head (10, 120) according to claim 1, wherein the cutting edge (26, 132) extends from the longitudinal axis (A) of the cutting head to the peripheral surface (18, 128).

13. A drilling cutting tool (12, 122) comprising:
a cutting head (10, 120) in accordance with claim 1; and
a shank (82, 182) having a longitudinal axis (B), the shank (82, 182) having a forward engagement portion (95, 219) at a forward end (84, 186) of the shank and a rear engagement portion (119, 224) rearward to the forward engagement portion, a through bore (88, 190) extends between the shank forward end (84, 186) and a shank rear end (86, 188);

wherein:
the shank (82, 182) is connected to the cutting head through the forward engagement portion (95, 219).

14. The cutting tool (12, 122) according to claim 13, wherein the shank forward end (84, 186) is brazed to the cutting head rear end (16, 126).

15. The cutting tool (12, 122) according to claim 13, wherein:

the at least one major guiding segment (20, 130) has a head circular extension (77, 178);

the shank forward end (84, 186) is provided with at least one forwardly projecting projection (92, 194) having a shank circular extension (115, 204);

the forwardly projecting projection mates with the at least one major guiding segment (20, 130) of the cutting head (10, 120); and the shank circular extension is complementary to the head circular extension (77, 178).

16. The cutting tool (12, 122) according to claim 13, wherein the rear engagement portion (119, 224) of the shank (82, 182) is an external thread (118, 222).

17. The cutting tool (12, 122) according to claim 13, wherein:

the forward engagement portion (95, 219) has a forward diameter (F);

the rear engagement portion (119, 224) has a rear diameter (K); and the forward diameter (F) is larger than the rear diameter (H).

18. The cutting tool (122) according to claim 13, wherein:

the peripheral surface (128) of the cutting head (120) is further provided with a locating slot (180) that extends from the cutting head forward end (124) to the cutting head rear end (126); and the shank (182) is further provided with a forwardly projecting projection (210) that mates with the locating slot (180) when the cutting head (120) is put on the shank (182) such that the longitudinal axis (A) of the cutting head (120) coincides with the longitudinal axis (B) of the shank (182).

19. A cutting head (10) formed asymmetrically with respect to a longitudinal axis (A) and comprising:

a cutting head forward end (14), a cutting head rear end (16) distal the cutting head forward end (14) and a peripheral surface (18) therebetween, at least two circumferentially spaced apart major guiding segments (20) extending from the cutting head forward end (14) to the cutting head rear end (16);

a cutting edge (26) formed on each of the major guiding segments (20) at the cutting head forward end, each cutting edge (26) extending from a forward end center zone (28) of the cutting head to the peripheral surface, a radially outermost end (30) of the cutting edge (26) defining a cutting diameter (D), the cutting edge having a rake surface (32) extending rearwardly therefrom;

a major guiding pad (44) associated with each cutting edge (26), each major guiding pad (44) having a forward end (46) and a guiding pad rear end (48) axially distal therefrom, the guiding pad forward end (46) joining its associated cutting edge (26) at the radially outermost end of that cutting edge, the guiding pad forward end (46) lying on a cylindrical envelope defined by the cutting diameter (D), wherein:

the cutting head (10) comprises sintered carbide powders;

the guiding pads (44) are integrally formed with the cutting head to have unitary one-piece construction; and the cutting edges (26) formed on the major guiding segments (20) are non-identical.

20. A drilling cutting tool (12) comprising:
a cutting head (10) in accordance with claim 19; and
a shank (82) having a longitudinal axis (B), the shank (82) having a forward engagement portion (95) at a forward end (84) of the shank and a rear engagement portion (119) rearward to the forward engagement portion, a through bore (88) extends between the shank forward end (84) and a shank rear end (86);

wherein:
the shank (82) is connected to the cutting head through the forward engagement portion (95).

21. The cutting tool (12) according to claim 20, wherein:
each major guiding segment (20) has a head circular extension (77);

the shank forward end (84) is provided with at least two forwardly projecting projections (92, 94) each having a shank circular extension (115);

the at least two forwardly projecting projections mate with the at least two major guiding segments (20) of the cutting head (10); and the shank circular extension is complementary to the head circular extension.

* * * * *